No. 856,649. PATENTED JUNE 11, 1907.
J. F. MOTT.
HORSE COLLAR.
APPLICATION FILED SEPT. 19, 1906.

Witnesses
John D. Mooy Jr
Lucille O'Neill.

Inventor
John F. Mott
by Wm M Morrow
Attorney

UNITED STATES PATENT OFFICE.

JOHN F. MOTT, OF CLEVELAND, OHIO.

HORSE-COLLAR.

No. 856,649.  Specification of Letters Patent.  Patented June 11, 1907.

Application filed September 19, 1906. Serial No. 335,172.

*To all whom it may concern:*

Be it known that I, JOHN F. MOTT, a citizen of the United States, and a resident of Cleveland, county of Cuyahoga, State of Ohio, have invented certain new and useful Improvements in Horse-Collars, of which I hereby declare the following to be a full, clear, and exact description, such as will enable others skilled in the art to which it appertains to make and use the same.

The objects of the invention are to provide instrumentalities for strengthening the lower end of a draft horse collar so as to prevent it from becoming broken on account of the constant opening and closing of the upper ends of the collar, for providing a permanent and rigid loop which will maintain its shape under all conditions of use and wear, and which while forming a natural and suitable curve for the lower end of the collar will place it out of contact with the horse's neck and throat so that it will not interfere with the functions of breathing and swallowing.

A further object is to provide a support over which the hame straps can be buckled and which by its projecting and downwardly turned forward edge will prevent the strap from slipping off and will retain it in position whether the horse is going forward or backward.

A further object is to provide a laterally expansible reinforcing tube for the lower curve of the "rim" of the collar, which can be filled with the straw or other filling of the rim and hence provide a continuous rim which will not break when the collar is opened more or less to accommodate it to the necks of horses of varying sizes.

A further object is to provide a metal tube which is longitudinally separable into two portions for expansibility when the straw filling is forced therein and to so arrange the division lines between the sections that their edges will not cut or wear the leather covering over them.

A further object is so to arrange the shapes of the sides of the tube as to provide for so attaching the collar body to the rim that the combined rim and body will present an inner edge having a general inclination such as to conform to the inclination of the throat of the horse and hence have no tendency to chafe or compress it in any way.

To accomplish these objects, I provide a split tube curved to conform to the above recited requirements and the invention comprises also the details arrangement and conformation of the various parts, as hereinafter described, shown in the accompanying drawings, and specifically pointed out in the claims.

Figure 1:
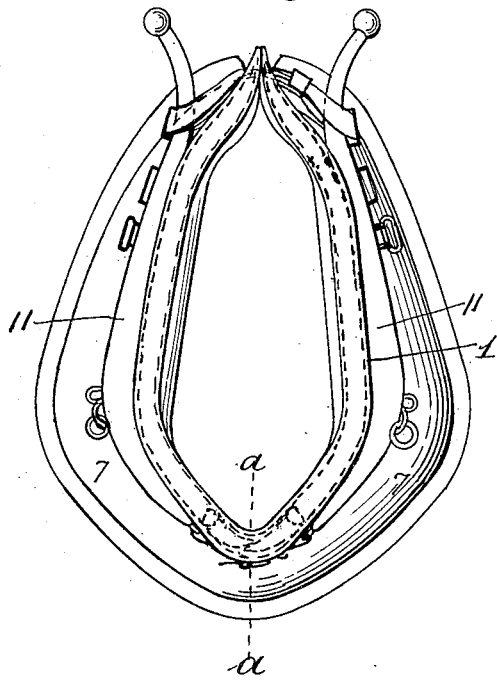
Figure 2:
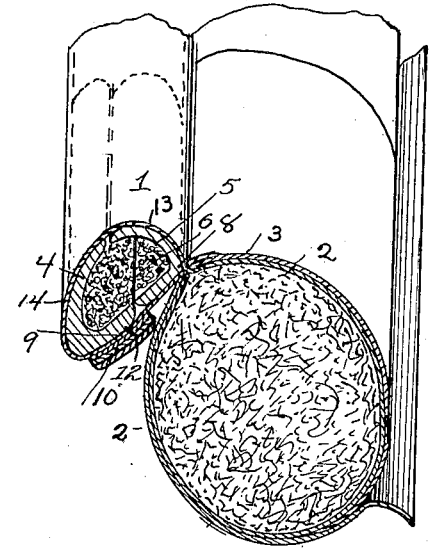
Figure 3:
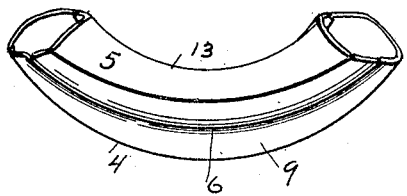
Figure 4:
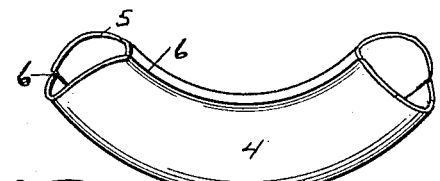
Figure 5:
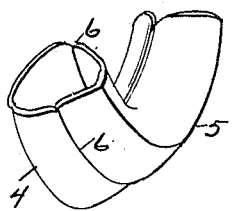

In the accompanying drawings, Figure 1 is a front view of the collar showing the rim which forms the foundation to which the cushioned body is attached, and showing the reinforcing tube in the lower end; Fig. 2 is an enlarged transverse section thereof, on center line *a—a—*of the loop, showing the projecting lower edge of the rim and the inner tube, and the inclination of the inner edge to which the body of the collar is attached, and the position of the dividing line between the portions of the inner tube; Fig. 3 is a rear view of the curved reinforcing tube; Fig. 4 is a front view thereof; Fig. 5 is a perspective view of the tube.

In these views, 1 is the rim which is formed of shaped leather and filled with tightly packed straw. The leather forming the rim is broad enough to extend also at 2 to inclose the body or larger cushion portion 7, and the band or leather 3 is sewed over the loop portion. The lower edge of the loop is maintained in rigid-shape by means of a short inner tube made in two longitudinal portions 4 and 5 united in a substantially vertical plane at 6. This tube is of flattened cylindrical form and the division line is shown cutting across the flattened sides rather than at the sharper edges, which is important in preventing them from cutting through the leather covering which they would soon do when the leather was strained over them, if the division line were carried through at the edges. The body of the collar is attached at the elevated inner edge of the tube at 8, and hence the lower surface 9 of the tube projects downward and forward and is thus adapted to receive the buckled strap 10 of the hames 11. The lower surface is also rounded or raised at 12 at the inner end of the outer division so that the strap will bend over it and be prevented thereby from slipping off, when the horse pulls backward on the harness. In this manner a perfectly tight fastening for the harness is obtained which will not permit the strap to loosen or break away from the collar in whatever direction the horse may pull upon it. The point of attachment for the body of the collar is also raised by this means, to permit of the introduction of the strap between it and the tube and rim. It is not advisable however to raise the body higher than the rim at this point or to interfere in any way with action of the horse's throat, hence the collar is made to depend from the point of attachment and the inner edge and upper surface of the tube rises from this point at 13, to form with the body a general upward incline approximating that of the horse's neck. This and a portion of the lower surface are formed on one inner division of the tube, and the other division completes the lower forwardly and downwardly inclined and rounded surface and presents a smoothly curved front at 14.

The separability of the parts is an important feature since the straw filling is forced into the ends of the tube as tightly as possible, and while a slight movement of the side portions of the rim upon the tube is thus permitted the parts can not become broken by repeated opening and shutting of the collar, since the ends of the straw filling become tapered or wedged in shape and permit a slight movement thereof in the ends of the tube without breaking.

I am aware that heretofore attempts have been made to reinforce with metal the lower loop in a horse collar so as to free the horse's throat from contact therewith and form a rigid loop of permanent shape. The metal parts when made too long have become bent when opening the collar and have retained this undesirable form and when made shorter in length have been in the form of exterior plates and hence objectionable in appearance and in lessening the flexibility of the collar or have been adapted only for two piece rims riveted to the metal loop and hence liable to become broken and detached. The advantages enumerated provide the long felt necessity of a flexible collar which will not break when repeatedly opened and which will protect the throat and prevent the slipping of the hame strap.

In this device the ends of the straw filling are pressed into the open ends of the tube and preferably pass one another. To facilitate this and also make the joint with the leather covering smoother the ends of the tube are formed thinner than the central portion as shown in Figs. 2, 3, 4 and 5.

Having described the invention what I claim as new and desire to secure by Letters Patent is:

1. A horse collar comprising a stuffed body portion, a supporting rim therefor, a leather covering enveloping both body and rim and a forming tube for the lower loop of the rim, and inserted therein, said tube being longitudinally separable into two portions, and the divisional plane therein being substantially vertical, substantially as described.

2. A flattened reinforcing and forming tube for the purpose described, comprising longitudinally separable portions the plane of division being substantially vertical, the combined lower surfaces of the said portions being downwardly and forwardly inclined, and the rear upper surface of the inner portion being upwardly and forwardly curved, substantially as and for the purpose set forth.

3. A horse collar comprising in combination, a stuffed body portion, and stuffed supporting rim therefor, a leather covering over both portions, a seam at the connecting line between said portions, an expansible forming and reinforcing tube in two separable portions inserted in the loop of the rim, said tube being forwardly and downwardly inclined on its lower surface, and upwardly and forwardly inclined above its inner edge, the stuffing in said rim extending between the separable portions of said reinforcing tube.

In testimony whereof I hereunto set my hand this 15" day of September, 1906.

JOHN F. MOTT.

Witnesses:
Wm. M. Monroe,
Geo. S. Cole.